(12) United States Patent
Herget

(10) Patent No.: US 9,183,863 B2
(45) Date of Patent: Nov. 10, 2015

(54) TAPE DIMENSION COMPENSATION

(71) Applicant: International Business Machines Corporation, Armonk, NY (US)

(72) Inventor: Philipp Herget, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/546,121

(22) Filed: Nov. 18, 2014

(65) Prior Publication Data

US 2015/0170694 A1 Jun. 18, 2015

Related U.S. Application Data

(62) Division of application No. 14/132,178, filed on Dec. 18, 2013, now Pat. No. 9,013,826.

(51) Int. Cl.
*G11B 5/56* (2006.01)
*G11B 5/584* (2006.01)
*G11B 20/10* (2006.01)

(52) U.S. Cl.
CPC .................. *G11B 5/584* (2013.01); *G11B 5/56* (2013.01); *G11B 20/10* (2013.01)

(58) Field of Classification Search
None
See application file for complete search history.

(56) References Cited

U.S. PATENT DOCUMENTS

| | | | |
|---|---|---|---|
| 5,629,813 A | 5/1997 | Baca et al. | |
| 5,739,973 A * | 4/1998 | Echigo | 360/77.14 |
| 6,222,698 B1 * | 4/2001 | Barndt et al. | 360/76 |
| 6,282,040 B1 * | 8/2001 | Bartlett | 360/31 |
| 6,282,051 B1 | 8/2001 | Albrecht et al. | |
| 6,545,834 B1 | 4/2003 | Melbye | |
| 6,903,895 B2 | 6/2005 | Chliwnyj et al. | |
| 7,158,339 B2 | 1/2007 | Kuse et al. | |
| 7,486,464 B2 * | 2/2009 | Saliba | 360/77.12 |
| 7,764,460 B2 | 7/2010 | Bates et al. | |
| 8,213,107 B2 | 7/2012 | Saliba et al. | |
| 2006/0072235 A1 | 4/2006 | Kuse et al. | |
| 2009/0073603 A1 * | 3/2009 | Koeppe | 360/77.12 |
| 2009/0128949 A1 * | 5/2009 | Matsuno et al. | 360/77.12 |
| 2011/0216434 A1 * | 9/2011 | Bui et al. | 360/51 |
| 2012/0206832 A1 | 8/2012 | Hamidi et al. | |
| 2013/0188271 A1 * | 7/2013 | Fasen et al. | 360/31 |
| 2014/0002916 A1 * | 1/2014 | Harper | 360/31 |

FOREIGN PATENT DOCUMENTS

JP 2001006461 A 1/2001

OTHER PUBLICATIONS

Herget, "Tape Dimension Compensation," filed Nov. 18, 2014, p. 1-27, U.S. Appl. No. 14/546,112.
Herget, "Tape Dimension Compensation," filed Dec. 18, 2013, p. 1-29, U.S. Appl. No. 14/132,178.

* cited by examiner

*Primary Examiner* — Thang Tran
(74) *Attorney, Agent, or Firm* — David Zwick; Randall J. Bluestone

(57) ABSTRACT

In response to determining that a first write operation is to be performed on a portion of tape, writing data to a data track with a tape head element spacing at a nominal value. A tape width of one or more tape positions at which data is written is recorded. In another aspect, a tape width value associated with a tape is retrieved. A current tape width value associated with the tape is determined, and the tape head element spacing is set based on a difference between the retrieved tape width value and the determined current tape width value.

2 Claims, 8 Drawing Sheets

TAPE DIMENSION COMPENSATION

FIELD OF THE INVENTION

The present invention relates generally to the field of magnetic information storage and retrieval, and more particularly to automatically compensating for transverse dimensional changes to a magnetic tape.

BACKGROUND OF THE INVENTION

As densities for linear tape storage systems increase due to advancements in materials and storage schemes, precision alignment of the tape heads to data tracks is an increasingly challenging requirement for accurate recording and reading of stored data. At high track densities, alignment is affected by changes in tape width due to environmental conditions, such as temperature and humidity, and mechanical stress to the tape, which can cause the lateral spacing of the data tracks in a data band to shrink or expand. Generally, increasing the temperature or humidity will cause expansion of the tape width, and applying longitudinal stress to the tape will cause tension narrowing of the tape width. Changes to the lateral spacing of the data tracks may result in a misalignment of the tape head elements on the tape head assembly, such as read and write heads, with the data tracks on the tape. Depending on the latitudinal density of data tracks and the coefficients of thermal and hygroscopic expansion of the tape substrate material, the degree of expansion under certain environmental conditions may cause the lateral spacing of the data tracks under the read heads of the tape head assembly to expand to the point where not all data tracks can be read by the tape heads.

One method of adjusting for the effects of changes to tape width while recording and reading data is to change the relative spacing of the read and write elements with respect to the tape by adjusting the tape head azimuth angle. Another method is to change the longitudinal tension on the tape, causing a corresponding change to the lateral dimension of the tape. To facilitate this adjustment, a pair of servo tracks can be used to measure the physical width of the tape relative to that of the two servo elements.

Correct read and write element spacing relative to the data tracks in the presence of changing tape width may be maintained by a feedback control system. Such a control system may require both a method of determining the relative spacing, and an established reference value, or servo set point. One method of determining the relative spacing makes use of servo patterns written in the servo bands on either side of data bands during manufacturing. The servo patterns typically consist of magnetic transitions with two different azimuthal slopes, such as a chevron pattern, that are read by a pair of servo read heads located on the tape head. The servo read heads' lateral-position relative to a servo track is derived from the relative timing of pulses read by the servo read heads while reading the servo pattern. Reference signals for feedback control can then be chosen with respect to the spacing computed from the servo patterns. For example, the control system could adjust the azimuth angle of the tape head assembly or the tape tension such that both servo read heads track in the center of their respective servo patterns, and thus properly adjust the read head spacing relative to the data tracks. If the servo spacing changes while the tape is running in the tape drive unit, the servo feedback control system can compensate for these changes.

A number of factors can contribute to differences in servo pattern spacing. During manufacturing of the tape, the pattern width may be affected by the environmental conditions during the writing of the servo patterns. Further variation may be introduced by tolerances in constructing the servo writer head, which will also lead to differences in servo pattern spacing. Additionally, aging of the tape causes the servo pattern spacing to change over time. This change is typically non-uniform due to the differences in pack pressure, or how tightly wound the tape is, within the tape cartridge. For example, tape at the inner diameters of the cartridge typically become wider than tape at the outer diameters due to these differences in pack pressure.

SUMMARY

Embodiments of the present invention disclose methods and systems for compensating for tape dimensional changes. A method for compensating for tape dimensional changes includes, in response to determining that a first write operation is to be performed on a portion of tape, writing data to a data track with a tape head element spacing at a nominal value. A tape width of one or more tape positions at which data is written is recorded.

In another aspect of the invention, a tape width value associated with a tape is retrieved. A current tape width value associated with the tape is determined, and the tape head element spacing is set based on a difference between the retrieved tape width value and the determined current tape width value.

In another aspect of the invention, a tape drive system includes a tape head that has two or more servo read elements for reading servo patterns in two or more servo tracks on a magnetic tape. A controller operates to receive signals from the servo read elements and determine a current width value corresponding to the width of the servo tracks. The controller is further operated to cause the current width value to be recorded to a data store.

In another aspect of the invention, the controller is further operated to read a recorded width value associated with the magnetic tape, and set a tape head element spacing based on a difference between the recorded width value and the determined current tape width value.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Embodiments of the present invention generally describe a method and apparatus that efficiently compensates for changes in the tape width. A tape drive executes a first write pass to a data band of a tape by writing to the tape using a predetermined data track width without feedback servo control of the relative spacing of the heads and the tape. The actual tape width, as measured, for example, by the servo track width, is recorded as a function of position during the writing process. In subsequent tape accesses, including read passes and subsequent write passes, the relative spacing of the heads to the tape, as controlled, for example, by tape head azimuth angle or tape tension, is servo controlled to match the first recorded track. The spacing can be adjusted by comparing the tape width recorded during the first write pass to the tape width at the time of the subsequent access. Using this technique, the tape drive avoids compensating for changes to tape dimension that occur between tape servo writing during manufacturing, and the first write pass in the tape drive.

Figure 1:
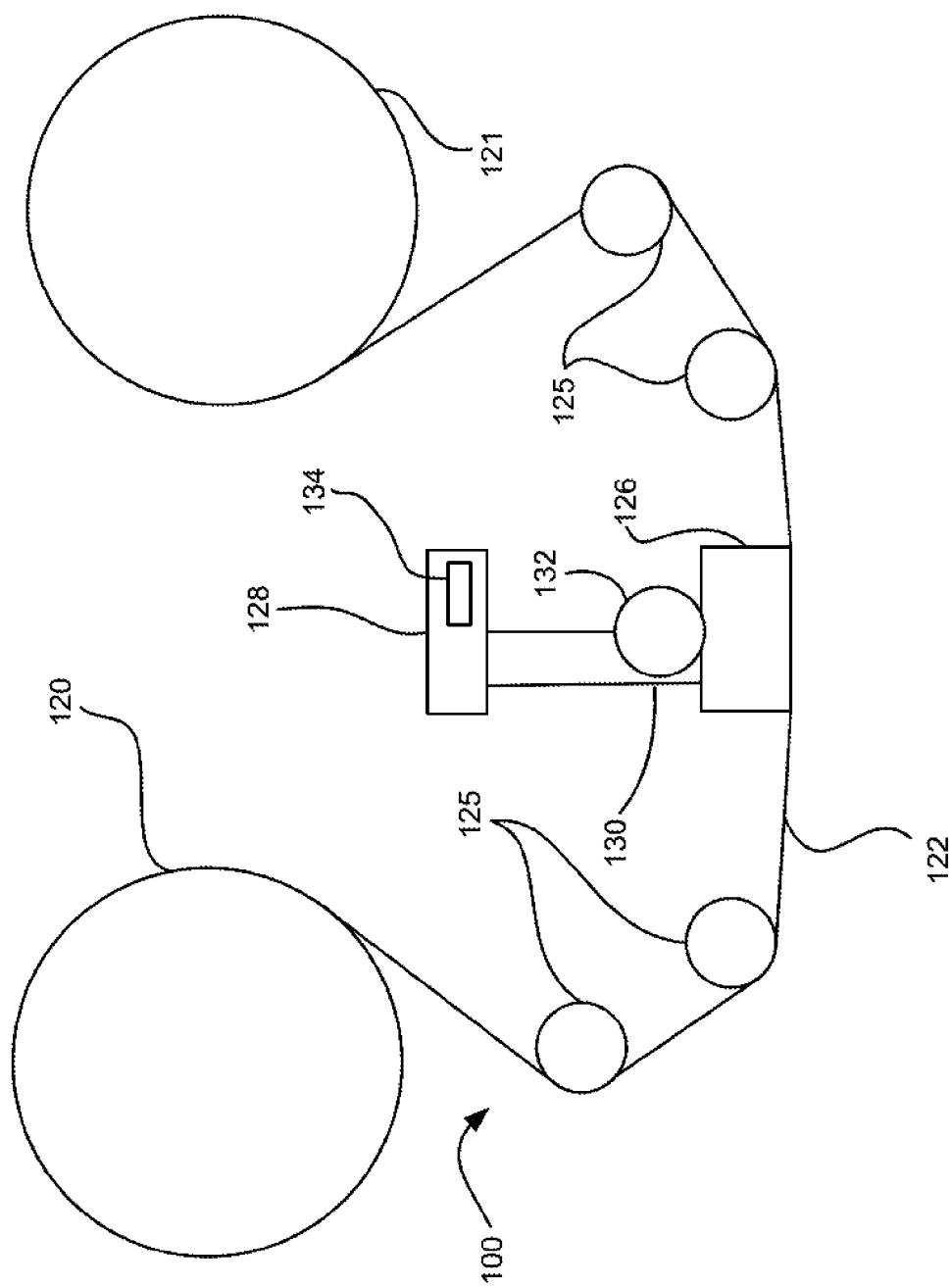
FIG. 1 is a simplified component view of tape drive, in accordance with an embodiment of the present invention.

FIG. 1 illustrates a simplified tape drive 100 of a tape-based data storage system, in accordance with an embodiment of the present invention. While one specific implementation of a tape drive is shown in FIG. 1, it should be noted that the embodiments described herein may be implemented in the context of any type of tape drive system.

As shown, tape supply cartridge 120 and take-up reel 121 are provided to support a tape 122. One or more of the reels may form part of a removable cassette and are not necessarily part of tape drive 100. Tape drive 100 typically includes drive motors (not shown) to drive tape supply cartridge 120 and take-up reel 121 to move tape 122 over a tape head 126 of any type.

Guides 125 guide tape 122 across tape head 126. Tape head 126 is in turn coupled to a tape controller 128 via a cable 130. In exemplary embodiments, tape controller 128 at least controls certain functions of tape head 126, such as servo following, data writing, data reading, etc. Cable 130 may include read/write circuits to transmit data to tape head 126 to be recorded on the tape 122 and to receive data read by tape head 126 from the tape 122. An actuator 132 controls the positioning of tape head 126 relative to tape 122.

An interface 134 may also be provided for communication between tape drive 100 and a host computing system (integral or external) to send and receive data and for controlling the operation of the tape drive and communicating the status of the tape drive to the host computing system, as will be understood by those of skill in the art.

Figure 2:
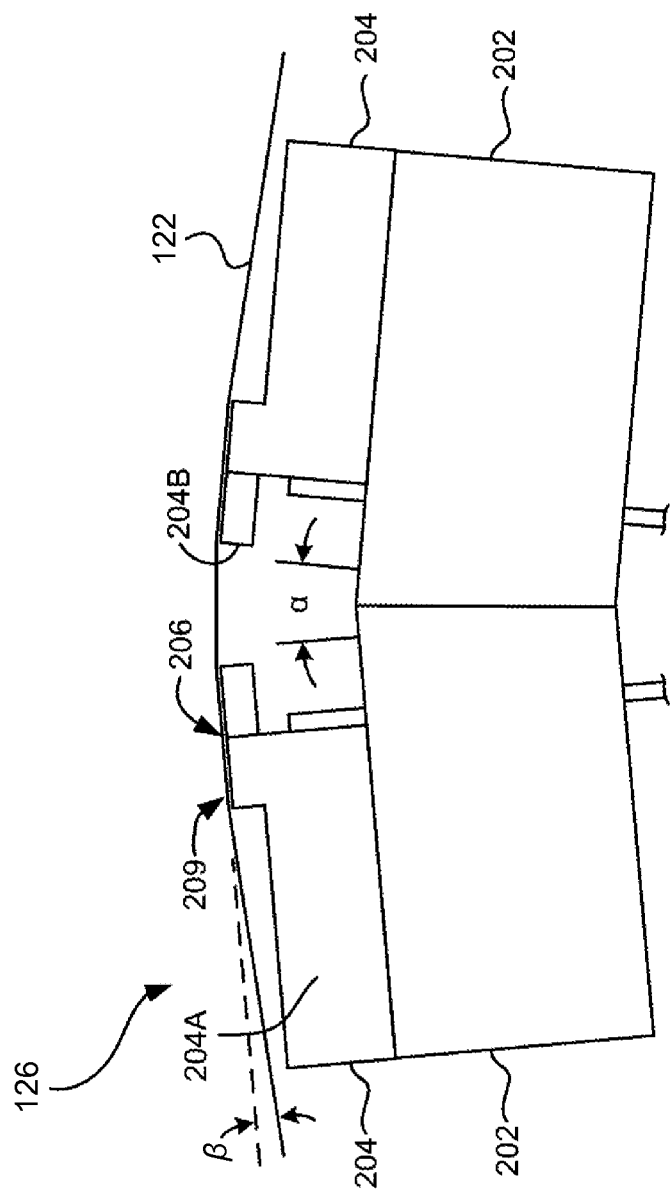
FIG. 2 is a side view of a tape head of the tape drive of FIG. 1, in accordance with an embodiment of the present invention.

FIG. 2 illustrates a side view of an exemplary embodiment of tape head 126 of FIG. 1, in accordance with an embodiment of the present invention. In the exemplary embodiment, tape head 126 is a flat-lapped, bi-directional, two-module magnetic tape head. Note that in various embodiments of the present invention, other configurations may be used, which themselves may include components similar to and/or different than those shown in FIG. 2, as will be apparent to one skilled in the art. Tape head 126 includes a pair of modules, each comprised of a base 202, bonded to a chip 204. Each chip 204 includes a substrate 204A and a closure 204B with a thin film portion, commonly referred to as a "gap" in which the read and/or write heads 206 are formed. The bases 202 are typically "U-beams" which provide space for a cable in the center and allow adhesive bonding near the edges of the U. The U-Beam bases are bonded together at a small angle α with respect to each other. After bonding, the two modules form a single physical unit to provide read-while-write capability by activating the write heads of the leading module and read heads of the trailing module aligned with the write heads of the leading module parallel to the direction of tape travel. In operation, tape 122 is moved over chips 204 along tape bearing surfaces 209 for reading and writing data on tape 122 using read and/or write heads 206. The wrap angle β of tape 126 at edges going onto and exiting the flat tape bearing surfaces 209 are usually between ⅛ degree and 4 ½ degrees. Substrates 204A and closures 204B of chip 204 are typically constructed of a wear resistant material, such as a ceramic.

Figure 2A:
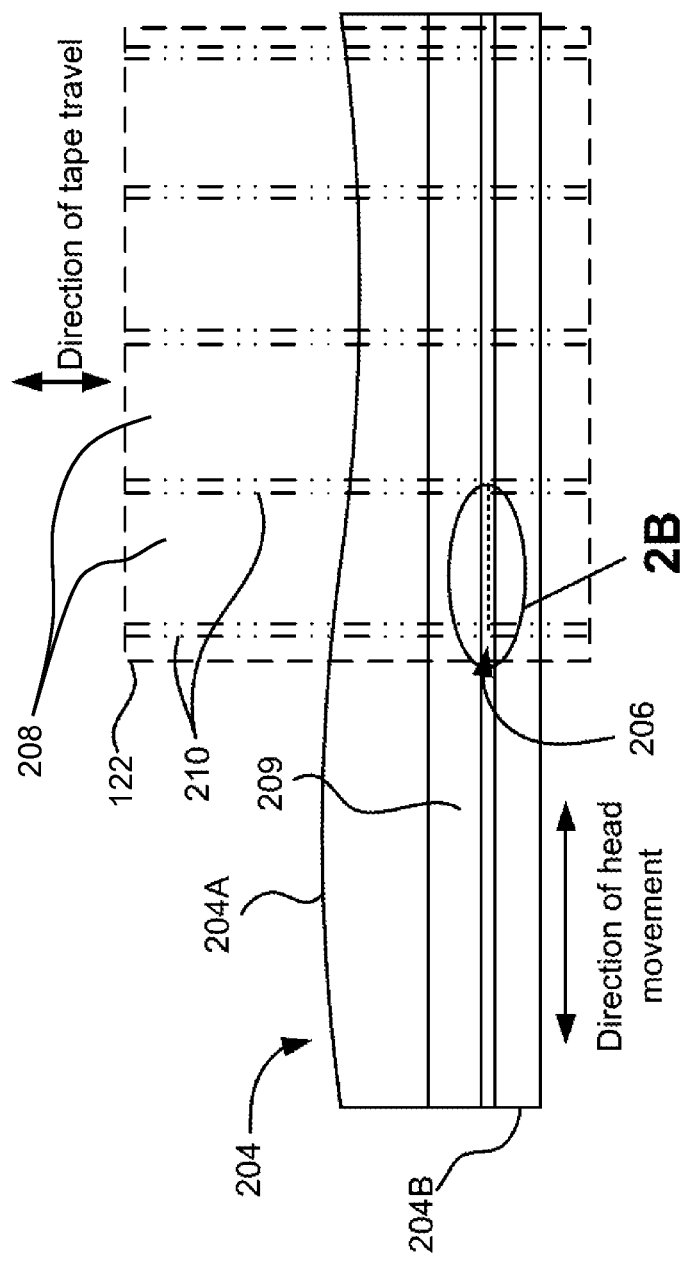
FIG. 2A is a plan view of a tape bearing surface of the tape head of FIG. 2, in accordance with an embodiment of the present invention.

FIG. 2A illustrates a plan view of tape bearing surface 209 of a chip 204 from the perspective of looking down upon tape bearing surface 209 of FIG. 2. A representative tape 122 is shown in dashed lines. In this exemplary embodiment, tape 122 includes 4 data bands 208, and 5 servo tracks 210 on a one-half inch wide tape 122. Data bands 208 are defined between servo tracks 210. Each data band 208 may include a number of data tracks, for example 96 data tracks (not shown). During read/write operations, read and/or write heads 206 are positioned within one of the data bands 208. Servo read heads read servo tracks 210. Servo signals generated when servo read heads read servo tracks 210 may be used to keep read and/or write heads 206 aligned with data tracks in a particular data band 208 during read/write operations. Chip 204 is preferably long enough to be able to support tape 122 as the head steps between data bands.

Figure 2B:
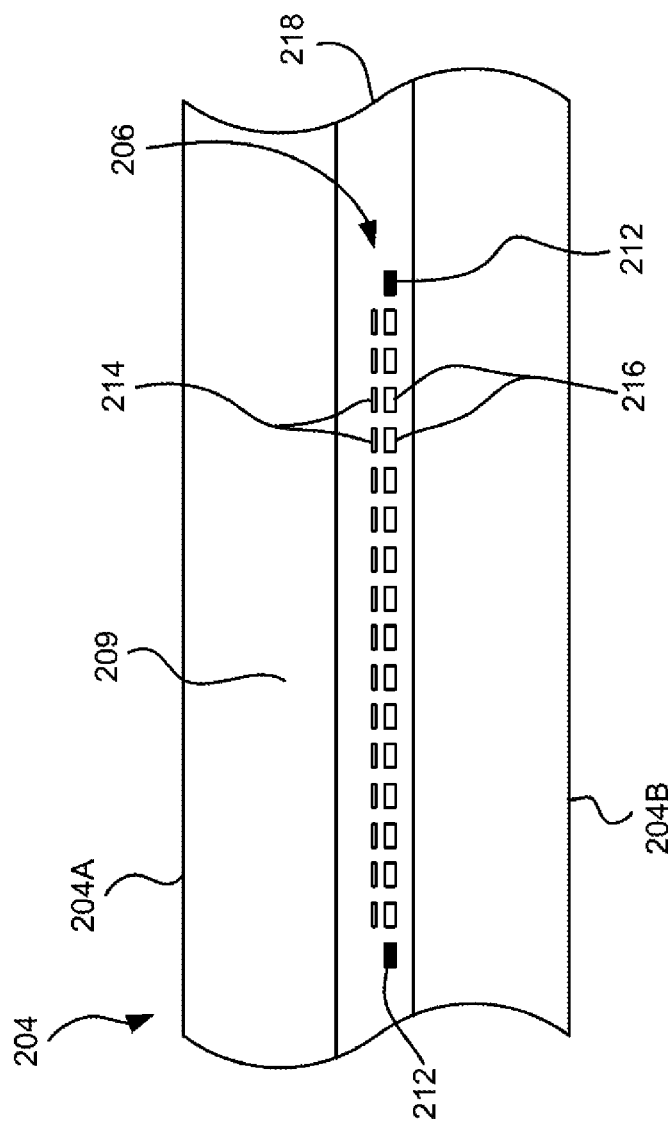
FIG. 2B is a detailed view of the read and/or write heads of the tape head of FIG. 2, in accordance with an embodiment of the present invention.

FIG. 2B depicts a plurality of read and/or write heads 206 formed in a gap 218 on a chip 204 in Circle 2B of FIG. 2A. As shown, the array of read and/or write heads 206 includes, for example, 16 data write heads 214, 16 data read heads 216 and two servo read heads 212, though the number of elements may vary. While the read and/or write heads 206 may be arranged in a piggyback configuration as shown in FIG. 2B, data read heads 216 and data write heads 214 may also be arranged in an interleaved configuration. Alternatively, each array of read and/or write heads 206 may be data read heads or data write heads only, and the arrays may contain one or more servo read heads 212. As noted by considering FIGS. 2, 2A, and 2B together, each chip 204 may include a complementary set of read and/or write heads 206 for such things as bi-directional reading and writing, read-while-write capability, backward compatibility, etc. In general, the data read heads 216 on one chip 204 are aligned with the data write heads 214 on the opposite chip 204, such that data written by one module can subsequently be read by the second module as the tape moves from one module to the second module. Any of these arrays may contain one or more servo read heads 212.

Figure 3A:
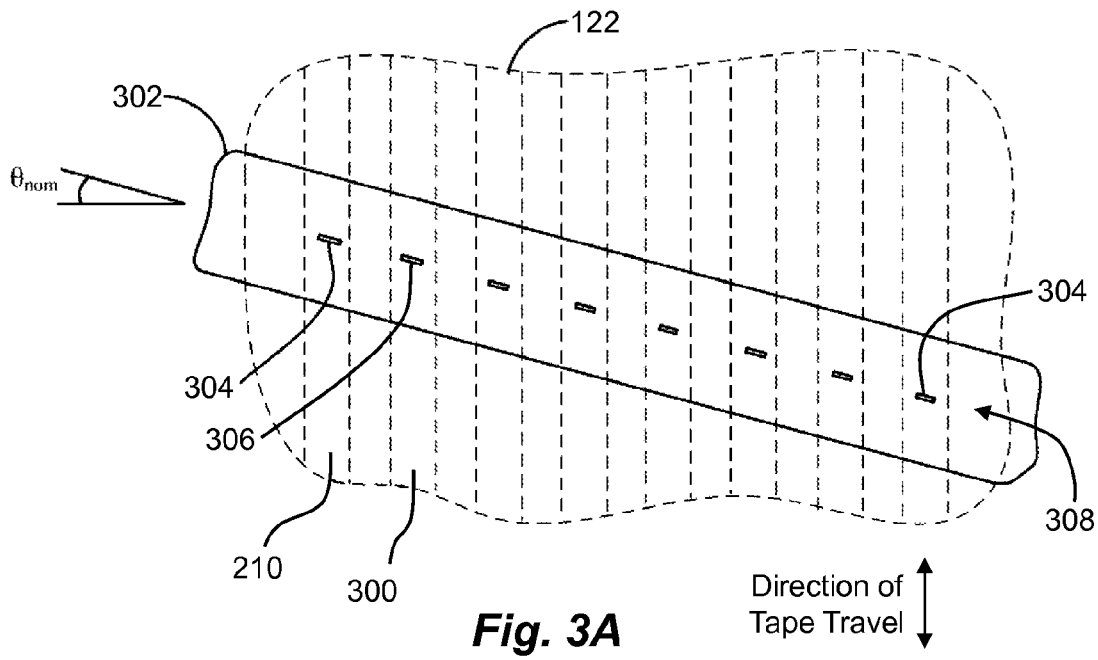
FIGS. 3A-3C illustrate how tape lateral expansion and contraction may be compensated for by adjusting azimuth angle of a tape head, in accordance with an embodiment of the present invention.
Figure 3B:
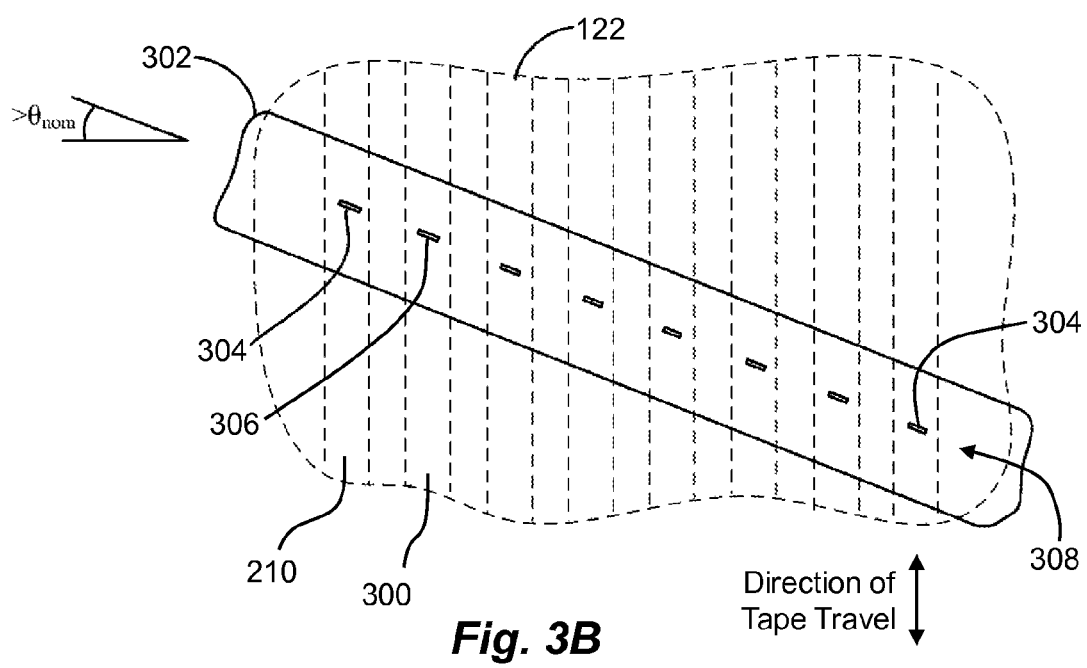
Figure 3C:
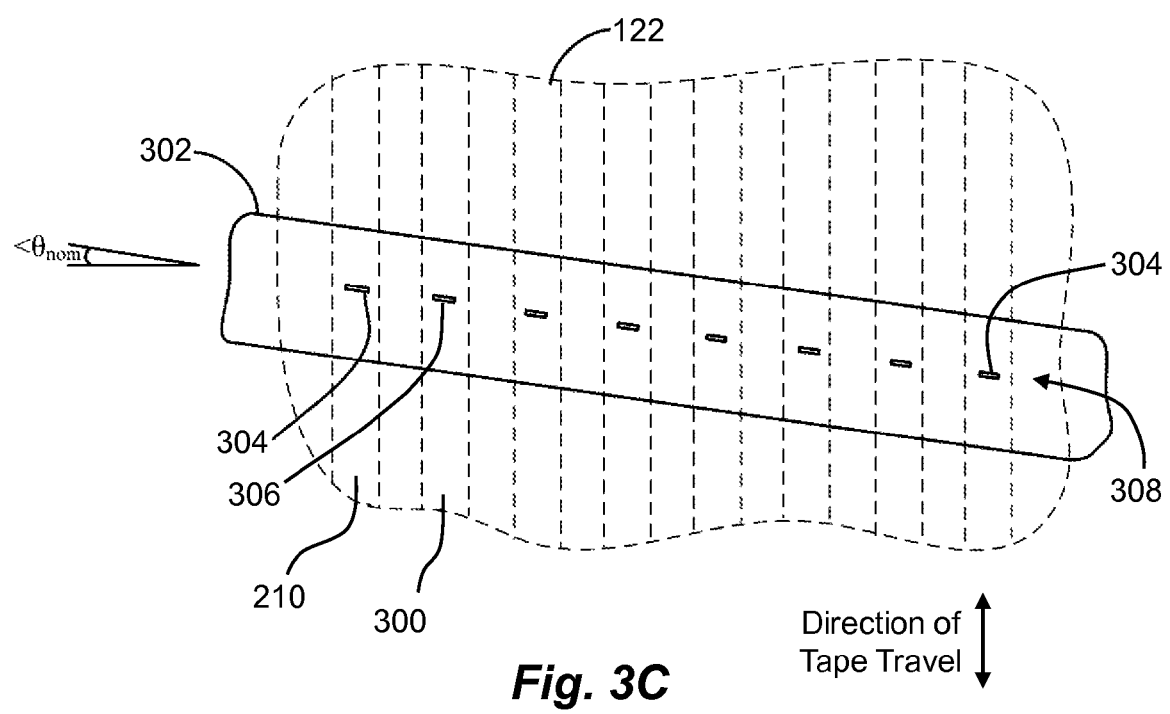

FIGS. 3A, 3B, and 3C illustrate how tape lateral expansion and contraction may be compensated for by adjusting azimuth angle θ of a tape head 302, in accordance with an embodiment of the present invention. FIGS. 3A, 3B, and 3C show tape 122 with servo tracks 210 and data tracks 300, and tape head 302 with read and/or write heads 308, showing in this example servo read heads 304 and data read heads 306. As indicated, the direction of tape travel is longitudinally in the direction of the data and servo tracks, and tape head 302 is disposed predominantly laterally across tape 122.

In various embodiments, compensating for tape lateral expansion and contraction is achieved by adjusting azimuth angle θ of tape head 302 with respect to the latitudinal axis of tape 122, thereby altering the relative spacing of read and/or write heads 308, as projected in the direction of tape travel of the tape over read and/or write heads 308. Generally, the projected relative spacing of read and/or write heads 308 is governed by the product of the cosine of θ and the actual spacing of read and/or write heads 308 on tape head 302. In one embodiment, to compensate for tape lateral expansion and contraction, tape head 302 is set to a nominal azimuth angle $\theta_{nom}$ based, for example, on a nominal servo track and data track spacing defined in a specification or standard associated with the tape technology. Adjustments may be made to azimuth angle θ to keep the projected relative spacing of read and/or write heads 308 aligned with servo tracks 210 and data tracks 300 of tape 122. This solution is represented for a single chip 204 in FIGS. 3A, 3B, and 3C.

FIG. 3A shows tape head 302 relative to tape 122, where the tape has a nominal width. As shown, servo read heads 304 and data read heads 306 are aligned with servo tracks 210 and data tracks 300, respectively, on tape 122. Tape head 302 is at an azimuth angle $\theta_{nom}$. FIG. 3B shows tape head 302 adjusted to an angle greater than azimuth angle $\theta_{nom}$ to compensate for tape lateral contraction. FIG. 3C shows tape head 302 adjusted to an angle less than azimuth angle $\theta_{nom}$ to compensate for tape lateral expansion. In the embodiment illustrated in FIG. 2, which includes two chips 204, each having a tape head assembly, a coupling arrangement between the two chips 204 may be used to ensure that both modules maintain the same azimuth angle when adjustments to the angle are made.

Figure 4:
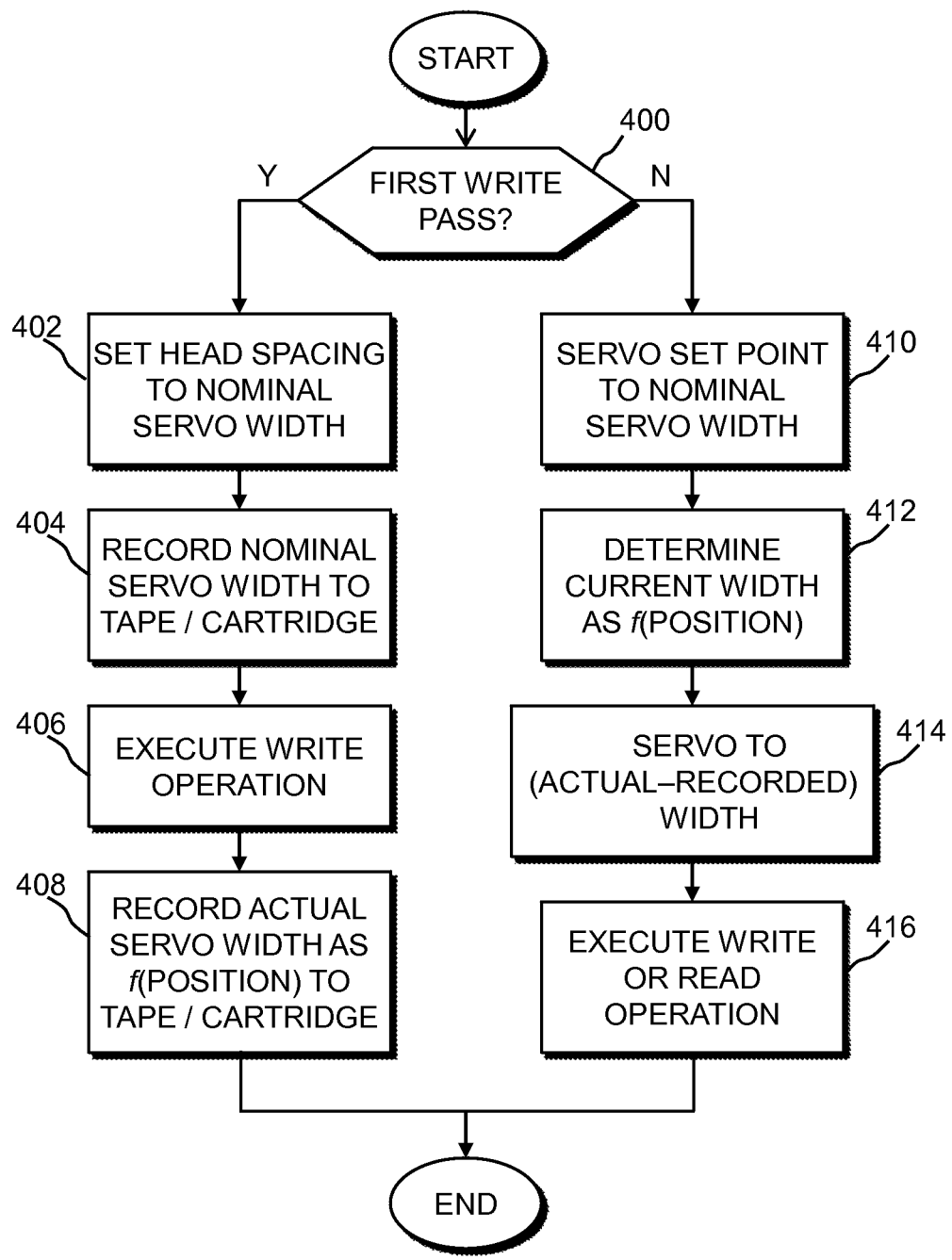
FIG. 4 is a flowchart illustrating operational steps of a tape dimension compensation system, in accordance with an embodiment of the present invention.

FIG. 4 is a flowchart illustrating operational steps of a tape dimension compensation system, in accordance with an embodiment of the present invention. When a write operation is requested on a tape that has been loaded into a tape drive, for example, tape 122 loaded into tape drive 100, the system determines if the write operation is to a portion of tape on which no data tracks have been written (step 400). In one embodiment, a portion of tape to which no data bands have been written is defined as a section of tape where the data track to be written will not be located directly adjacent to any other data tracks across the width of the tape. In another embodiment, the portion of the tape to which no data bands have been written is defined as a portion of tape where no data tracks have been written at that longitudinal position anywhere across the width of the tape.

In an exemplary embodiment, tape 122 satisfies one of the Linear Tape-Open (LTO) standards in which the tape includes multiple data bands, each including multiple data tracks. Data is written consecutively to data bands on the tape, and consecutively to data tracks within each data band. Each data track is written approximately the full length of the tape— from the start of tape marker to the end of tape marker, or vice versa—before writing to the next data track. The data bands are physically separated from one another by the servo tracks. Data tracks are written to each data band in a serpentine fashion, writing the first track to the top of the data band, the second to the bottom of the data band, the third next to the first at the top of the data band, the fourth next to the second, and so on. When the entire first and second track in each data band is written, there are no adjacent tracks present on that portion of the tape. Therefore, in a preferred embodiment, if the entire first and second data tracks of the current data band has been written to, then the system will determine that the write operation to the tape will not be a first pass. In another embodiment, a new portion of tape is a portion of tape to which the first track in the current data band has not been written.

If this is the first write pass for a portion of tape, tape read/write head element spacing, for example, servo read head spacing, is set to the nominal value associated with the tape technology by setting the tape drive tape head azimuth angle and/or the tape tension accordingly (step 402); for example, setting the azimuth angle of tape head 126 and/or the tape tension of tape 122 through control of the drive motors that drive tape supply cartridge 120 and take-up reel 121. In other embodiments, adjusting the relative spacing of the tape read/write head elements with respect to the tape may be accomplished by other methods known to those skilled in the art. For example, elements, or groups of elements, on the tape read/write head may be moved relative to one another. In other embodiments, the nominal tape read/write head element spacing can be dependent on tape position to compensate for the effects of pack pressure.

The nominal tape read/write head width is then recorded to the tape or tape cartridge (step 404). For example, the nominal tape read/write head width may be recorded to the media auxiliary memory of a tape cartridge, such as the cartridge memory referenced in the Linear Tape-Open (LTO) standard for magnetic tape data storage, or another electronic non-volatile memory of a tape cartridge. Alternatively, the nominal tape read/write head width may be recorded to the tape itself, for example, to the tape header or to a special purpose dataset on the tape, or stored in a dataset on a computer-readable tangible storage medium on a host computing system and accessible to the tape drive via, for example, an interface, such as interface 134. In certain embodiments, the nominal tape read/write head width is not recorded by the system. Instead, for example, the nominal tape read/write head width may be a defined system variable, based on the technology of the tape drives used in a production environment.

The first pass write operation then executes (step 406), for example, by writing data to the first data track on a data band on the tape. While the write operation is executing, the actual tape width, for example, the actual servo track spacing as determined from servo read head signals from tape head 126 to tape controller 128, is recorded to the tape or tape cartridge as a function of tape position (step 408). In other embodiments, this width information may be stored in a temporary buffer and then later written to the tape, for example to the tape header or to the media auxiliary memory of the tape cartridge. In exemplary embodiments, the tape width at regular tape distance intervals or logical positions, such as the beginning of each tape block, is recorded. In a preferred embodiment, the actual tape width is determined as a function of longitudinal position on the tape, which may be determined, for example, via information encoded in the servo patterns of the servo tracks.

Figure 5:
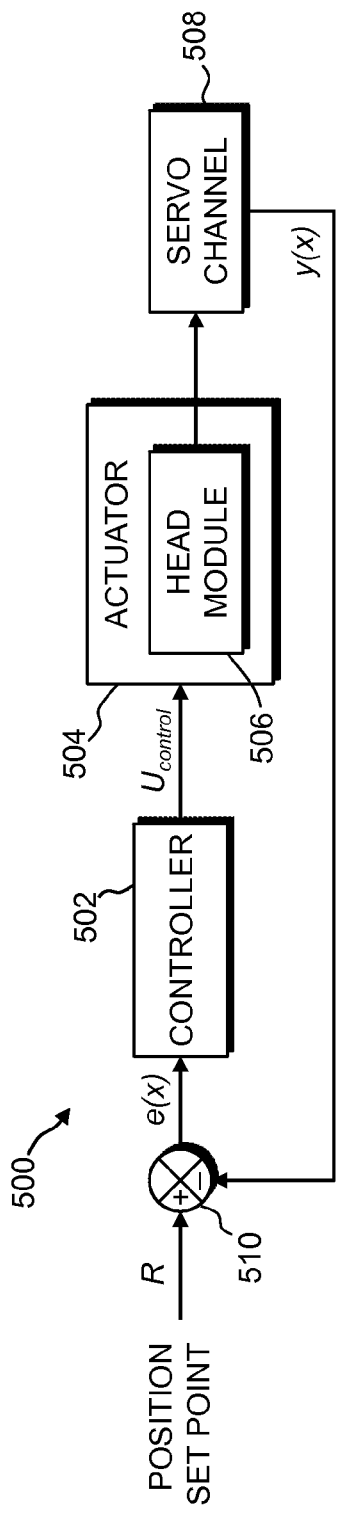
FIG. 5 is a simplified block diagram of a time-based servo control system for controlling the tape head of a tape drive when executing a first pass write to tape, in accordance with an embodiment of the present invention.

FIG. 5 illustrates a simplified block diagram of a tape-position-based position servo control system 500 for controlling the lateral position of a tape head of a tape drive, for example tape head 126 of tape drive 100, when executing a first pass write to tape, in accordance with an embodiment of the present invention (see steps 402-408 of FIG. 4). In this servo control system, tape head azimuth angle and/or tape tension are set such that the read and write head spacing is at the nominal tape read/write head width associated with the technology of the tape. Lateral position feedback signal y(x)

from servo channel 508, which is a function of tape position, is received by subtracter 510, along with position center set point signal R. Subtracter 510 generates a position error signal signal e(x) that is used by controller 502 to generate a control signal $U_{control}$ to actuator 504 to, for example, laterally center head module 506 between servo tracks. Servo read heads on head module 506 generate electrical signals in response to detecting the magnetic transitions of the servo patterns, and transmit these signals to servo channel 508, which computes the lateral position of head module 508, and provides this as the feedback signal y(x) to subtracter 510. Thus, while the actual tape width may vary as data is written to the tape in a first write pass, the tape read/write head element spacing remains fixed, i.e., no adjustments to tape head azimuth angle and/or tape tension are made.

Returning to FIG. 4, if the write operation, or a read operation, is to a portion of tape that has been written to before (step 400, "N" branch), the servo set point, and the read/write head spacing, is set to the nominal servo width that, for example, was recorded to the tape or cartridge on the tape's first pass write (step 410). The current width of the tape is then determined at the position of the current read or write operation (step 412), for example, the actual servo track width as determined from servo read head signals from tape head 126 to tape controller 128. The current tape width at the position of the current read or write operation is then compared to the recorded tape width at the corresponding position that was recorded at the time of the first write pass (see step 408). The difference between the current tape width and the recorded tape width is then used to adjust the tape head azimuth angle and/or the tape tension so as to align the read/write heads with the data tracks written during the first write pass (step 414). The read or write operation is then executed (step 416).

Although steps 412 to 416 are indicated as occurring consecutively, in practice, these steps occur approximately concurrently and continuously. For example, the tape width as a function of tape position is continuously measured, and is used as feedback in the servo system to achieve the desired tape head spacing. As the servo system runs in the background and maintains the correct spacing, data is written to the tracks. These tracks are now adjacent to tracks that already exist on the tape.

As mentioned above, once a first data track has been written to a tape, all subsequent data tracks written to the tape, at least in the same data band, must be in alignment with the first data track. In embodiments of the invention, the first data track is written with the tape head read/write elements at a fixed nominal spacing, without regard for the actual tape width or variations in the tape width as a function of tape position. However, the actual tape width as a function of tape position is recorded as the first track is written. In subsequent read and write operations, at least in the same data band as the first track, the tape head read/write element spacing begin at the nominal spacing, and adjustments to spacing are made based on the difference between the tape width at the time the first track was written (as recorded at the time of writing the first track) and the actual tape width at the time of the subsequent read or write operation.

The recorded tape width, at which the first write pass data was written to the tape, and the current tape width may be different due to environmental and tape aging differences between when the first write pass occurred and the subsequent read or write operation occurs. Adjusting the azimuth angle and/or tape tension to account for any difference between the current and recorded tape width will bring the read/write heads into alignment with the data tracks, although not necessarily with the servo tracks.

Figure 6:
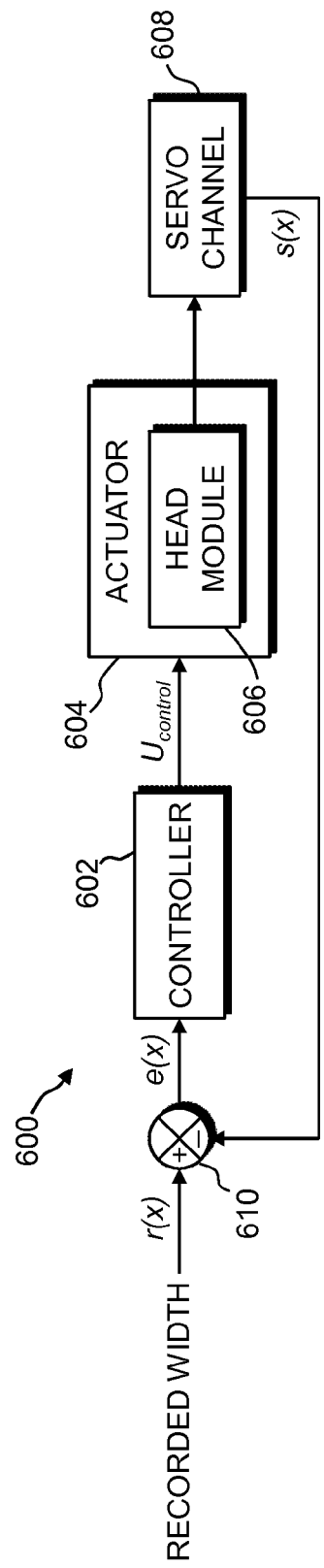
FIG. 6 is a simplified block diagram of a time-based servo control system for controlling the tape head of a tape drive when executing a read or write operation to a portion of tape that has been written to before, in accordance with an embodiment of the present invention.

FIG. 6 illustrates a simplified block diagram of a tape-position-based tape width servo control system 600 for controlling the read/write element spacing of a tape head of a tape drive when executing a read or write operation to a portion of tape on which at least the first data track has been previously written to, in accordance with an embodiment of the present invention (see steps 410-416 of FIG. 4). In such a subsequent read or write operation, a time-based position servo control system for controlling the lateral position of a tape head of a tape drive, such as time-based position servo control system 500, would also be operating.

In an exemplary embodiment of tape width servo control system 600, the set point signal r(x) for the read/write element spacing of the tape head is governed by the tape width recorded during the first write pass. Tape width feedback signal s(x) from servo channel 608 indicates the current tape width at the current tape position of the tape head. Signal s(x) is subtracted from the recorded tape width at the time of the first write pass, via signal r(x) and subtracter 610, to generate width error signal e(x). Controller 602 uses width error signal e(x) to generate control signal $U_{control}$ to actuator 604 to control the read/write element spacing of head module 606, for example, by adjusting the azimuth angle of the tape head of head module 608. Servo read heads on head module 606 generate electrical signals in response to detecting the magnetic transitions of the servo patterns, and transmit these signals to servo channel 608, which computes the read/write element spacing of head module 606, and provides this as the feedback signal s(x) to subtracter 610.

As will be appreciated by one skilled in the art, aspects of the present invention may be embodied as a system or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Any flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A tape drive system comprising:
a tape head comprising two or more servo read elements, operated to read servo patterns in two or more servo tracks on a magnetic tape and produce corresponding signals;
a controller operated, in response to determining that a requested tape operation to a tape is a first write pass, to:
set a tape head element spacing, with respect to a direction of travel of the tape over the tape head elements, to a predetermined width by setting an azimuth angle of a tape head containing the tape head elements;
record the tape head element spacing predetermined width to a data store associated with the tape;
write data to a data track of the tape;
receive the signals from the servo read elements and determine a width value corresponding to the width of the servo tracks at one or more tape positions at which data is written;
record the determined servo track width values to the data store;
the controller, in response to determining that a requested tape operation to a tape is not a first write pass, to:
retrieve the recorded tape head element spacing predetermined width from the data store associated with the tape;
set the tape head element spacing, with respect to a direction of travel of the tape over the tape head elements, to the predetermined width by setting the azimuth angle of the tape head containing the tape head elements;
retrieve the one or more recorded servo track widths at the one or more tape positions from the data store associated with the tape;
determine a current servo track width value associated with the tape; and
adjust the tape head element spacing, with respect to the direction of travel of the tape over the tape head elements, by setting the azimuth angle of the tape head containing the tape head elements, based on a difference between the retrieved one or more recorded servo track widths and the determined current servo track width value.

2. A tape drive system in accordance with claim 1, wherein the data store is one or more of: the tape; media auxiliary memory of a tape cartridge containing the tape; an electronic non-volatile memory of a tape cartridge of the tape; and a dataset on a computer-readable tangible storage medium on a host computing system.

* * * * *